(12) United States Patent
Gennasio et al.

(10) Patent No.: US 10,082,234 B2
(45) Date of Patent: Sep. 25, 2018

(54) QUICK COUPLING ENGAGEABLE UNDER PRESSURE

(71) Applicant: Alfa Gomma S.p.A., Vimercate (Monza Brianza) (IT)

(72) Inventors: Enrico Gennasio, Vimercate (IT); Stefano Mazzoli, Mezzago (IT); Rinaldo Doi, Merlino (IT)

(73) Assignee: Alfa Gomma S.P.A., Vimercate (Monza Brianza) (IT)

( * ) Notice: Subject to any disclaimer, the term of this patent is extended or adjusted under 35 U.S.C. 154(b) by 17 days.

(21) Appl. No.: 15/309,621

(22) PCT Filed: May 8, 2015

(86) PCT No.: PCT/EP2015/060155
§ 371 (c)(1),
(2) Date: Nov. 8, 2016

(87) PCT Pub. No.: WO2015/173131
PCT Pub. Date: Nov. 19, 2015

(65) Prior Publication Data
US 2017/0146174 A1 May 25, 2017

(30) Foreign Application Priority Data

May 12, 2014 (IT) .............................. MI2014A0860

(51) Int. Cl.
*F16L 37/40* (2006.01)
*F16K 15/02* (2006.01)
(Continued)

(52) U.S. Cl.
CPC ............ *F16L 37/40* (2013.01); *F16K 15/026* (2013.01); *F16L 37/23* (2013.01); *F16L 37/32* (2013.01)

(58) Field of Classification Search
CPC . F16L 37/23; F16L 37/26; F16L 37/30; F16L 37/32; F16L 37/33; F16L 37/34;
(Continued)

(56) References Cited

U.S. PATENT DOCUMENTS 3,464,436 A 9/1969 Bruning
3,646,964 A 3/1972 Stratman
(Continued)

OTHER PUBLICATIONS

PCT International Search Report and Written Opinion of ISA dated Jul. 21, 2015 issued in corresponding PCT International Application No. PCT/EP2015/060155.

*Primary Examiner* — Ian Paquette
(74) *Attorney, Agent, or Firm* — Troutman Sanders LLP

(57) ABSTRACT

A quick coupling engageable under pressure comprises a first longitudinal body longitudinally having an internal cavity open at the ends along which it is supported slidably in contrast to and by action of elastic means, a second longitudinal body longitudinally having an internal cavity open at the ends and equipped with an opening and closing valve to the flow of a fluid under pressure, the first body and the second body having locking means adapted to cooperate for locking the coupling in the engaged position, the coupling in use, in the disengaged position in which it is supplied with a fluid under pressure acting in closure on the valve, having surfaces wet by the fluid under pressure configured and arranged to eliminate the volume variation of fluid under pressure present within the coupling as the position assumed by the second body in the first body varies.

7 Claims, 3 Drawing Sheets

(51) Int. Cl.
*F16L 37/23* (2006.01)
*F16L 37/32* (2006.01)

(58) Field of Classification Search
CPC ......... F16L 37/35; F16L 37/364; F16L 37/36;
F16L 37/40; Y10T 137/87965; F16K
15/026
USPC ............... 137/614.01, 614.02, 614.2, 614.21
See application file for complete search history.

(56) References Cited

U.S. PATENT DOCUMENTS

| | | | | |
|---|---|---|---|---|
| 6,161,578 A * | 12/2000 | Braun | ............... | F16L 37/0841 |
| | | | | 137/614.03 |
| 6,179,001 B1 * | 1/2001 | Schutz | ............... | F16L 37/565 |
| | | | | 137/614.01 |
| 7,168,449 B2 * | 1/2007 | Giagnoli | ............... | F16L 37/35 |
| | | | | 137/614.04 |
| 7,819,135 B2 * | 10/2010 | Aragones | ............... | F16L 37/32 |
| | | | | 137/614.02 |
| 2010/0096032 A1 * | 4/2010 | Kimura | ............... | B29C 33/0083 |
| | | | | 137/614.02 |
| 2013/0206261 A1 | 8/2013 | Prust et al. | | |

* cited by examiner

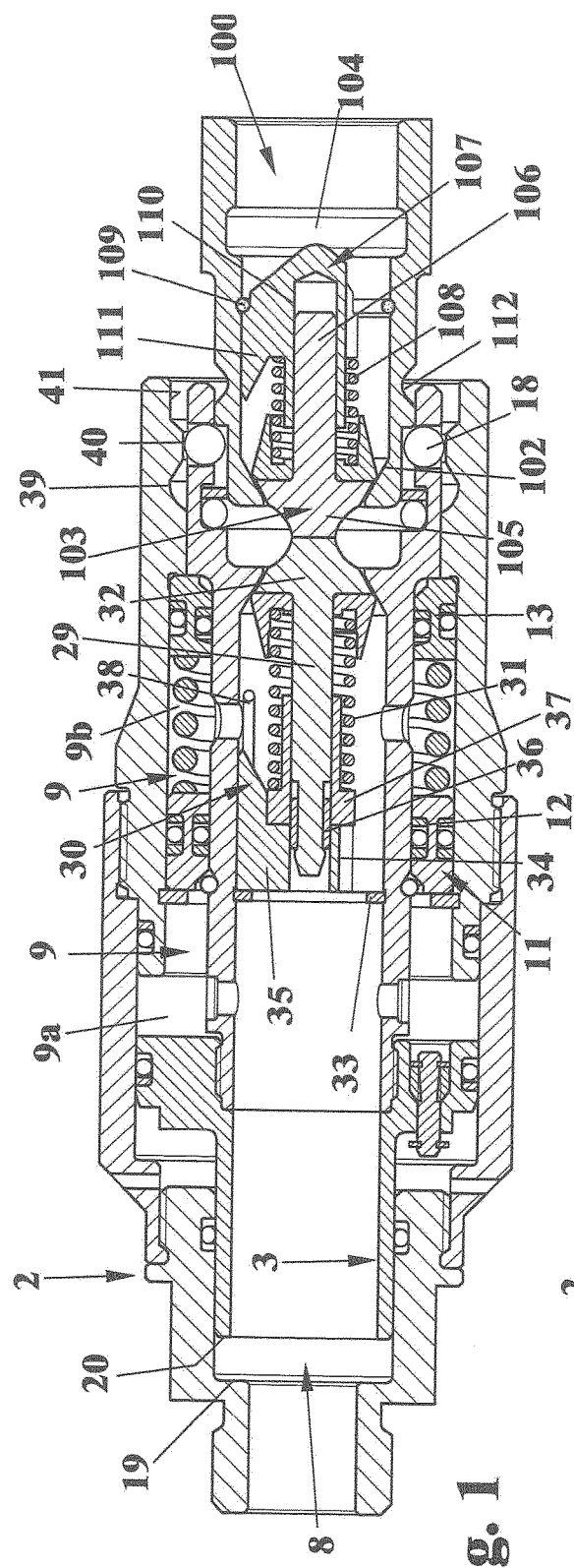
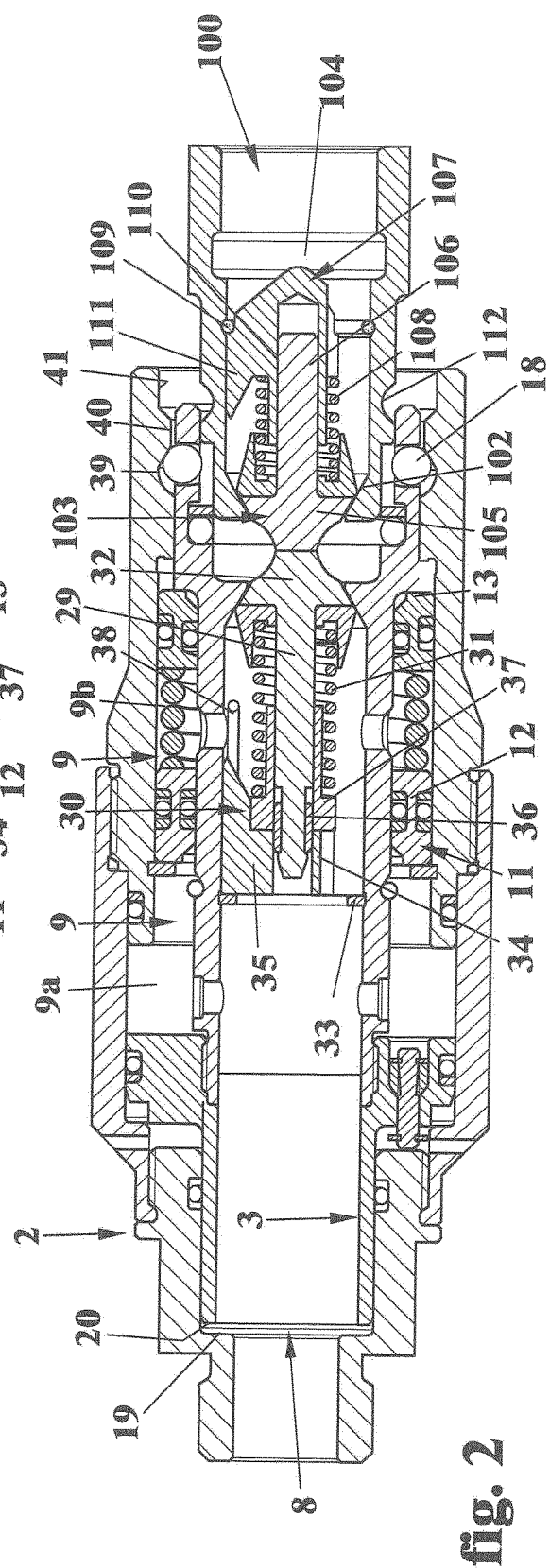
fig. 1
fig. 2

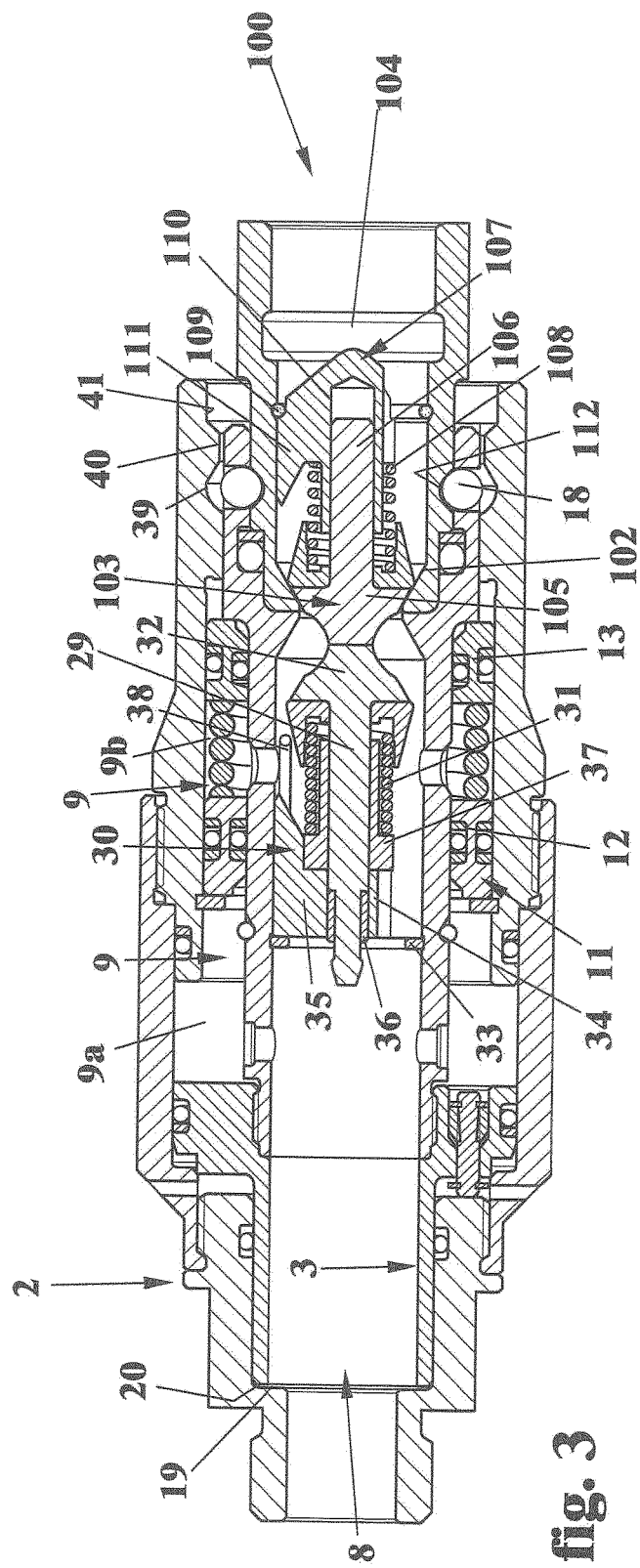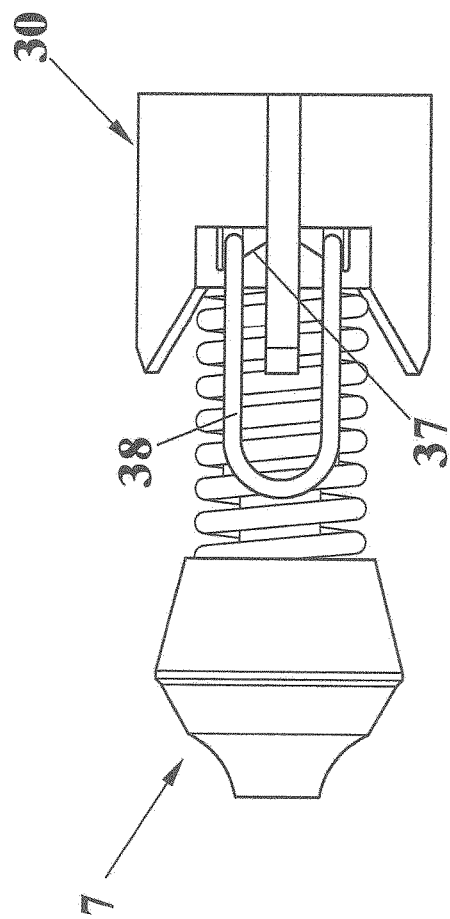
fig. 3
fig. 5

QUICK COUPLING ENGAGEABLE UNDER PRESSURE

CROSS-REFERENCE TO RELATED APPLICATIONS

This application is a U.S. National Phase Application under 35 U.S.C. § 371 of International Patent Application PCT/EP2015/060155, filed May 8, 2015, which claims priority to Italian Patent Application No. MI2014A 000860, filed May 12, 2014. The entire contents of these applications are hereby incorporated by reference.

FIELD OF THE INVENTION

The present invention relates to a quick coupling engageable under pressure, particularly a hydraulic or oil-pressure quick coupling to be used in agricultural and industrial applications.

BACKGROUND

A quick coupling engageable under pressure generally comprises a first hollow longitudinal body in which a second longitudinally hollow longitudinal body is inserted supported inside the first body in a longitudinally slidable way in contrast to and by action of appropriate elastic means.

The second body has a housing for an opening and closing valve to the flow of a fluid under pressure through the internal cavity of the second body itself.

The construction of the coupling comprising the second hollow body which is moveable with respect to the first hollow body is as known functional to the locking of the coupling in the engaged position. In fact, the first body and the second body have relevant locking means of the known type, adapted to cooperate for locking the coupling in the engaged position. For that purpose the elastic means operate to automatically recall the second body towards the position corresponding to locking the coupling in the engaged position.

One of the main drawbacks to be overcome when a coupling is to be engaged under pressure consists of the fact that the pressure of the fluid acting in closure on the valve, also generates a force that opposes the movement of the second body with respect to the first body and that consequently opposes the locking of the coupling in the engaged position.

Currently, to overcome this drawback a construction of the coupling is used wherein the internal surfaces wet by the fluid under pressure are configured and arranged to balance the thrust forces in the axial direction generated by the fluid under pressure net of the thrust force in the axial direction exerted by the elastic means.

SUMMARY

The technical task set by the present invention is to provide an alternative construction for a quick coupling engageable under pressure with the minimum possible effort for the operator.

The technical task, as well as these and other objects, according to the present invention, are reached by providing a quick coupling engageable under pressure, comprising a first longitudinal body longitudinally having an internal cavity open at the ends along which it is supported slidably in contrast to and by action of elastic means, a second longitudinal body longitudinally having an internal cavity open at the ends and equipped with an opening and closing valve to the flow of a fluid under pressure, said first body and said second body having locking means adapted to cooperate for locking the coupling in the engaged position, characterised in that in use said coupling, in the disengaged position in which it is supplied with a fluid under pressure acting in closure on the valve, has surfaces wet by the fluid under pressure configured and arranged to eliminate the volume variation of fluid under pressure present within the coupling as the position assumed by the second body in the first body varies.

In a preferred embodiment of the invention wet surfaces are configured and arranged to balance the thrust forces in the axial direction generated by the fluid under pressure on the second body net of the thrust force in the axial direction exerted by said elastic means.

Advantageously the wet surfaces delimit a plurality of chambers of variable volumes.

Other characteristics of the present invention are also defined in the claims herein below.

BRIEF DESCRIPTION OF THE DRAWINGS

Further characteristics and advantages of the invention will more fully emerge from the description of a preferred but not exclusive embodiment of the quick coupling engageable under pressure according to the invention, illustrated by way of non-limiting example in the accompanying drawings, in which:

FIGS. 1 to 4 show the sequence of configurations assumed by the coupling in the step from the disengaged position to the engaged position in a second coupling of a congruent type, wherein the couplings are shown in the axial section;

FIG. 5 shows in detail the precise positioning device of the open valve.

Figure 4:
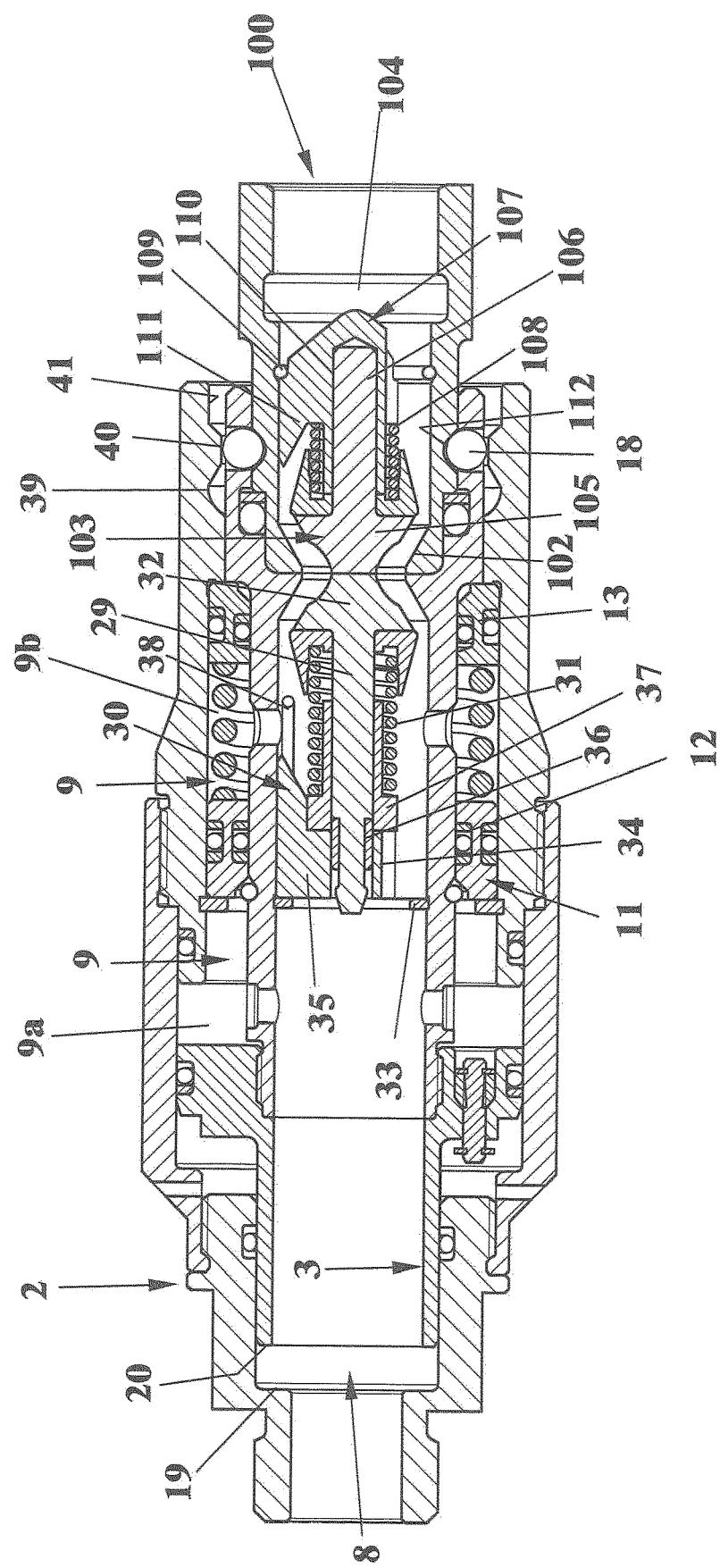

With reference to the mentioned figures, a special quick hydraulic coupling 1 is shown, particularly but not necessarily of the female type, engageable under pressure in a coupling 100 of a congruent type, in this case of the male type, commonly available on the market.

DETAILED DESCRIPTION OF THE INVENTION

As has been mentioned, although the preferred embodiment described below relates to a female quick coupling engageable under pressure, the invention obviously extends more generally also to a quick coupling engageable under pressure of the male type.

The coupling 1 comprises a first longitudinal body 2 having an internal cavity that extends along the longitudinal axis L of the first body 2 and is open at the ends 2', 2" of the first body 2.

In the specific case the first body 2 is formed by a series of three distinct tubular lengths 2a, 2b, 2c threaded and fixed to be screwed to one another.

The first body 2 has more precisely an internal and external circular cross section with a run in the axial direction of the external and internal diameter variable in sections.

The coupling 1 also comprises a second longitudinal body 3 having an internal cavity that extends along the longitudinal axis S of the second body 3 and is open at the ends 3', 3" of the second body 3.

In the specific case the second body 3 is formed by a series of two distinct tubular lengths 3a, 3b threaded and fixed to be screwed to one another.

The second body 3 has more precisely an internal and external circular cross section with a run in the axial direction of the external and internal diameter variable in sections.

The second body 3 is arranged with its longitudinal axis S oriented in the direction of the longitudinal axis L of the first body 2, in particular it is oriented coaxially to the longitudinal axis L of the first body 2, and is supported inside the first body 2 in a longitudinally slidable way in contrast to and by action of elastic means 4, formed for example by a helical spring.

In particular the opposite terminal sections of the wall of the second body 3 are slidably supported and guided by respective sections with a conjugated shape to the wall of the first body 2.

The second body 3 has a housing 6 for an opening and closing valve 7 to the flow of a fluid under pressure through the internal cavity 5 of the second body 3.

The valve 7 in a known way comprises a head 32 engageable in the housing 6 and a stem 29 axially slidable in a support and guide element 30 in contrast to and by action of a spring 31, interposed between the head 32 of the valve 7 and the support and guide element 30.

The support and guide element 30 is positioned against a stopping ring 33 housed in a channel on the internal surface of the wall of the second body 3 and comprises a central bushing 34 in which the stem 29 is slidable and radial centring fins 35 that rest against the internal surface of the wall of the second body 3.

The valve 7 is equipped in a known way with a precise opening positioning system comprising a sleeve 36 axially sliding in a groove in the stem 29, an axially hollow divaricator element 37 fitted onto the stem 29 and clamped by the spring 31 against the support and guide element 30, and an elastic fork 38 fitted onto the diameter of the stem 29 and openable by the divaricator 37 that actually locks it in the axial direction against the support and guide element 30. In practice, for opening the valve 7 it performs a backwards stroke with respect to the housing 6 and a subsequent forwards stroke shorter than the backwards stroke. During the backwards stroke the fork 38, being engaged on the external diameter of the sleeve 36, initially drags the sleeve 36 along the groove in the stem 29 and subsequently the fork 38, when the sleeve 36 reaches its stroke end, is disengaged from the sleeve 36 and is engaged on the stem 29. During the forwards stroke the fork 38, sliding on the external diameter of the stem 29, intercepts and pushes the sleeve 36 until it is engaged in the space of the groove in the stem 29 free from the movement of the sleeve 36. In this opening position the valve 7 remains locked when the coupling 1 is engaged. The subsequent closing of the valve 7 can be performed thanks to the divaricator element 37 which with its wedge-shaped surface presses between the legs of the fork 38 opening it to make it come out of the groove in the stem 29.

The first body 2 and the second body 3 are equipped with locking means adapted to cooperate for locking the coupling 1 in the engaged position.

The locking means on the first body 2 comprise, in proximity to the end 2", an internal perimetral projection 40 comprised between two internal perimetral channels 39 and 41.

The locking means on the second body 3 comprise, in proximity to the end 3", a crown of balls 18 positioned in tapered housings afforded through the wall thickness of the second body 3 and adapted to cooperate as can be seen with the perimetral projection 40.

The male coupling 100 comprises an axially hollow body 101 open at the ends and externally having a perimetral channel 112 adapted to cooperate with the balls 18 and internally a housing 102 for an opening and closing valve 103 to the flow of a fluid under pressure through the internal cavity 104 of the body 101.

The valve 103 in a known way comprises a head 105 engageable in the housing 102 and a stem 106 axially slidable in a support and guide element 107 in contrast to and by action of a spring 108, interposed between the head 105 of the valve 103 and the support and guide element 107.

The support and guide element 107 is positioned against a stopping ring 109 housed in a channel on the internal surface of the wall of the body 101 and comprises a central bushing 110 in which the stem 106 is slidable and radial centering fins 111 that rest against the internal surface of the wall of the body 101.

Advantageously when the coupling 1 is in use it is in the disengaged position wherein it is supplied with a fluid under pressure acting in closure on the valve 7, the internal surfaces of the coupling 1 wet by the fluid under pressure are configured and arranged to eliminate the volume variation of fluid under pressure contained within the coupling 1 as the position assumed by the second body 3 in the first body 2 varies.

Even more advantageously in this use configuration of the coupling, such internal surfaces wet by the fluid under pressure are configured and arranged to balance the thrust forces in the axial direction generated on the second body 3 by the fluid under pressure net of the thrust force in the axial direction exerted by the elastic means 4.

The wet surfaces delimit a plurality of chambers 8, 9a, 9b of variable volumes.

In particular, first wet surfaces 19, 20 delimit a first chamber 8 with a variable volume in direct fluid connection with the internal cavity of the second body 3.

The first chamber 8 comprises the end 3' of the wall of the second body 3 and the wall portion of the first body 2 comprised between the pair of homologous ends 2', 3' of the first body 2 and the second body 3.

Second wet surfaces 21, 22, 23, 24, 25, 26, 27 delimit a second chamber 9a with a variable volume and a third chamber 9b with a variable volume both in direct fluid connection with the internal cavity of the second body 3 through one or more through openings 10 afforded through the thickness of the wall of the second body 3.

The first chamber 9a and the second chamber 9b are created selectively differentiating in an intermediate axial area of the coupling 1, the internal diameter of the first body 2 with respect to the external diameter of the second body 3.

The second chamber 9a comprises portions of the walls of the first body 2 and the second body 3 and a wall 11 separating it from the third chamber 9b.

The wall 11 in common with the third chamber 9b is mobile in the longitudinal direction of the coupling 1 with respect to both the first body 2 and the second body 3.

The wall in common 11 between the second chamber 9a and the third chamber 9b is formed by a first sealing gasket 12 interposed between the wall of the first body 2 and the wall of the second body 3.

The third chamber 9b comprises portions of the walls of the first body 2 and of the second body 3, the wall 11 separating it from the second chamber 9, and a mobile wall in the longitudinal direction of the coupling 1 with respect both to the first body 2 and to the second body 3 and formed by a second sealing gasket 13 interposed between the wall of the first body 2 and the wall of the second body 3.

Definitively, the wet surfaces 21, 22, 23 that delimit the first chamber 9a are provided by a first area 21 of the internal surface of the wall of the first body 2, a first area 22 of the external surface of the wall of the second body 3, and a first area of the surface 23 of the sealing gasket 12.

The wet surfaces 24, 25, 26, 27 that delimit the second chamber 9b are, instead, provided by a second area 24 of the internal surface of the wall of the first body 2, a second area 25 of the external surface of the wall of the second body 3, a second area of the surface 26 of the first sealing gasket 12, and a first area of the surface 27 of the second sealing gasket 13.

The first wet surfaces 19, 20 and the second wet surfaces 21, 22, 23, 24, 25, 26, 27 are arranged and conformed so that, due to a movement of the second body 3 along the first body 2, the total volume variation of the first chamber 8 and the third chamber 9b is equal and opposite to the volume variation of the second chamber 9a.

The first body 2 and the second body 3 have respective stopping elements 14, 15 to stop the stroke of the first sealing gasket 12 and respective second stopping elements 16, 17 to stop the stroke of the second sealing gasket 13.

The stopping element 14 in particular is formed by a ring fixed into a perimetral channel in the internal surface of the wall of the first body 2, the stopping element 15 is formed by a ring fixed into a perimetral channel in the external surface of the wall of the second body 3, the stopping element 16 is formed by an abutment on the internal surface of the wall of the first body 2, and the stopping element 17 is formed by an abutment on the external surface of the wall of the second body 3. The elastic means 4 are arranged in the third chamber 9b in a position interposed between the first gasket 12 and the second gasket 13 and operate in compression for automatically positioning the first gasket 12 against at least one of the first stopping elements 14, 15 and against at least one of the second stopping means 16, 17.

The invention is clarified in more detail in the example reported below.

$R_{1e}$ and $R_{1i}$ are used to indicate the external radius and internal radius of the circular crown-shaped surface 28 of the mobile wall portion of the second body 3 that delimits the first chamber 9a.

$R_{2e}$ and $R_{2i}$ are used to indicate the external radius and the internal radius of the circular crown-shaped surface 27 of the second gasket 13 that delimits the second chamber 9b.

$R_{3e}$ is used to indicate the external radius of the second body 3 at the end 3'.

Let's imagine a relative movement $\Delta X$ between the first body 2 and the second body 3 in the longitudinal direction of the coupling 1.

The volume variation $\Delta V2$ of the third chamber 9b always has the same sign as the volume variation $\Delta V3$ of the first chamber 8 and the volume variations $\Delta V2$ and $\Delta V3$ always have a different sign from the volume variation $\Delta V1$ of the second chamber 9a.

Hence, by eliminating the volume variation of fluid under pressure contained inside the coupling 1, the following condition is obtained:

$$\Delta V2 + \Delta V3 = \Delta V1, \text{ i.e. as a first approximation:}$$

$$\pi(R^2_{2e} - R^2_{2i}) \times \Delta X + \pi R^2_{3e} \times \Delta X = \pi(R^2_{1e} - R^2_{1i}) \times \Delta X,$$
hence:

$$(R^2_{2e} - R^2_{2i}) + R^2_{3e} = (R^2_{1e} - R^2_{1i})$$

This equation determines the size restrictions that must be satisfied to guarantee the desired result.

Eliminating the volume variation of fluid under pressure contained inside the coupling 1 as the position assumed by the second body 3 in the first body 2 varies, prevents having to compress the fluid under pressure in the engagement and disengagement operations of the coupling under pressure.

If this is added to the fact that the surfaces wet by the fluid under pressure are configured and arranged to balance the thrust forces in the axial direction generated on the second body 3 by the fluid under pressure net of the thrust force in the axial direction exerted by the elastic means 4, a notable improvement in the operation of the coupling under pressure is obtained.

The rigid connection of the coupling under pressure 1 with the coupling 100, for example but not necessarily also under pressure, takes place as follows.

The male coupling under pressure 100 initially has valve 103 closed.

The female coupling under pressure 1 initially has valve 7 closed.

The operator introduces the male coupling under pressure 100 by the end 3'' of the second body 3 of the female coupling under pressure 1 and, after the head of the valve 103 abuts against the valve 7, the backwards movement of the second body 3 with respect to the first body 2 begins with valves 7, 103 which, due to the pressure of the fluid acting on them, initially remain closed.

During this backwards movement in the female coupling under pressure 1 there is a mass movement of fluid under pressure through the openings 10 but without it being necessary to compress them.

During this backwards movement also the second gasket 13 pushed by the abutment 17 moves backwards loading the elastic means 4, while the balls 18 are aligned and therefore introduced into the channel 39 removing the interference with the male coupling 100 and allowing the latter to penetrate further which causes the opening of the valve 7 of the female coupling 1 against the action of the spring 31 which is loaded, and the alignment of the balls 18 also with the channel 112 in the male coupling 100.

The axial force in the opening direction now exerted on the valve 103 also by the fluid under pressure coming out of the valve 7 of the female coupling 1 becomes prevalent and causes the opening of the valve 103.

At this point when the operator releases the male engagement 100 the elastic means 4 bring the second body 3 back into the starting position.

Due to the effect of this return movement the balls 18 are extracted from the channel 39 and released into the channel 112 into which they are introduced and are therefore aligned with the perimetral projection 40 which obliges them to stay wedged in the channel 112 hence locking the male coupling 100 into the second body 3 of the female coupling 1.

This lock can be removed by the operator exerting traction on the male coupling 100 in contrast to the action of the elastic means 4 which are loaded by effect of the interference of the ring 15 with the gasket 12.

Due to this traction the second body 3 moves towards the outside of the end 2'' of the first body 2 until the balls 18 are aligned with the perimetral channel 41. The balls 18 are now released into the perimetral channel 41 into which they are introduced to free the male coupling 100.

When the male coupling 100 is removed the elastic means 4 bring the second body 3 back into the starting position.

The quick coupling under pressure as conceived herein is susceptible of numerous modifications and variants, all falling within the scope of the inventive concept; furthermore, all the details are replaceable by technically equivalent elements.

The materials used, as well as the dimensions, may in practice be of any type, according to needs and the state of the art.

The invention claimed is:

1. A quick coupling engageable under pressure, comprising
   a first longitudinal body longitudinally supported slidably in contrast to and by action of an elastic element at a plurality of ends and having an internal cavity open at the ends, and
   a second longitudinal body longitudinally having an internal cavity open at the ends and equipped with a valve configured to open and block the flow of a fluid under pressure,
      wherein said first body and said second body having locking elements adapted to cooperate to lock said quick coupling in the engaged position,
      wherein in use said quick coupling, in the disengaged position in which said quick coupling is supplied with a fluid under pressure acting to move the valve in the closing direction, has surfaces wet by the fluid under pressure configured and arranged to eliminate the volume variation of fluid under pressure present within said quick coupling as the position assumed by said second body in said first body varies,
      wherein said wet surfaces delimit a plurality of chambers of variable volumes,
      wherein first wet surfaces delimit a first chamber with a variable volume comprising the wall portion of said first body comprised between a pair of homologous ends of said first and said second body,
      wherein second wet surfaces delimit at least one second chamber with a variable volume comprising the walls of said first and second body, said second chamber being in fluid connection with the internal cavity of said second body through one or more through openings afforded through the thickness of the wall of said second body,
      wherein said second wet surfaces delimit at least one third chamber with a variable volume comprising the walls of said first and second body, said third chamber being in fluid connection with the internal cavity of said second body through one or more through openings afforded through the thickness of the wall of said second body,
      wherein said second and third chamber have in common a wall separating one from the other mobile in the longitudinal direction with respect both to said first body and said second body, and
      wherein said separating wall is formed by a first sealing gasket interposed between the wall of said first body and the wall of said second body.

2. The quick coupling engageable under pressure according to claim 1, wherein said wet surfaces are configured and arranged to balance the thrust forces in the axial direction generated by the fluid under pressure on said second body comprising a net of the thrust force in the axial direction exerted by said elastic element.

3. The quick coupling engageable under pressure according to claim 1, wherein said third chamber has a further mobile wall in the longitudinal direction with respect both to said first body and said second body and formed by a second sealing gasket interposed between the wall of said first body and the wall of said second body.

4. The quick coupling engageable under pressure according to claim 1, wherein said first and second wet surfaces are arranged and conformed so that, due to the effect of a shift of said second body along said first body, the volume variation cumulatively of said first and third chamber is equal and opposite to the volume variation of said second chamber.

5. The quick coupling engageable under pressure according to claim 4, wherein said elastic element is positioned in said third chamber.

6. The quick coupling engageable under pressure according to claim 5, wherein said common wall is mobile in contrast to and by action of said elastic element.

7. A quick coupling engageable under pressure, comprising
   a first longitudinal body longitudinally supported slidably in contrast to and by action of an elastic element at a plurality of ends and having an internal cavity open at the ends, and
   a second longitudinal body longitudinally having an internal cavity open at the ends and equipped with a valve configured to open and block the flow of a fluid under pressure,
      wherein said first body and said second body having locking elements adapted to cooperate to lock said quick coupling in the engaged position,
      wherein in use said quick coupling, in the disengaged position in which said quick coupling is supplied with a fluid under pressure acting to move the valve in the closing direction, has surfaces wet by the fluid under pressure configured and arranged to eliminate the volume variation of fluid under pressure present within said quick coupling as the position assumed by said second body in said first body varies,
      wherein said wet surfaces delimit a plurality of chambers of variable volumes,
      wherein first wet surfaces delimit a first chamber with a variable volume comprising the wall portion of said first body comprised between a pair of homologous ends of said first and said second body,
      wherein second wet surfaces delimit at least one second chamber with a variable volume comprising the walls of said first and second body, said second chamber being in fluid connection with the internal cavity of said second body through one or more through openings afforded through the thickness of the wall of said second body,
      wherein said second wet surfaces delimit at least one third chamber with a variable volume comprising the walls of said first and second body, said third chamber being in fluid connection with the internal cavity of said second body through one or more through openings afforded through the thickness of the wall of said second body,
      wherein said second and third chamber have in common a wall separating one from the other mobile in the longitudinal direction with respect both to said first body and said second body,
      wherein said separating wall is formed by a first sealing gasket interposed between the wall of said first body and the wall of said second body,
      wherein said third chamber has a further mobile wall in the longitudinal direction with respect both to said first body and said second body and formed by a second sealing gasket interposed between the wall of said first body and the wall of said second body, wherein said first and second wet surfaces are arranged and conformed so that, due to the effect of a shift of said second body along said first body, the volume variation cumulatively of said first and third chamber is equal and opposite to the volume variation of said second chamber, wherein said elastic element is positioned in said third chamber, wherein said common wall is mobile in contrast to and by action of said elastic element, and wherein said first body and said second body have respective first stop elements to stop the stroke of a first sealing gasket and respective second stop elements to stop the stroke of a second sealing element.

* * * * *